Figure 7:
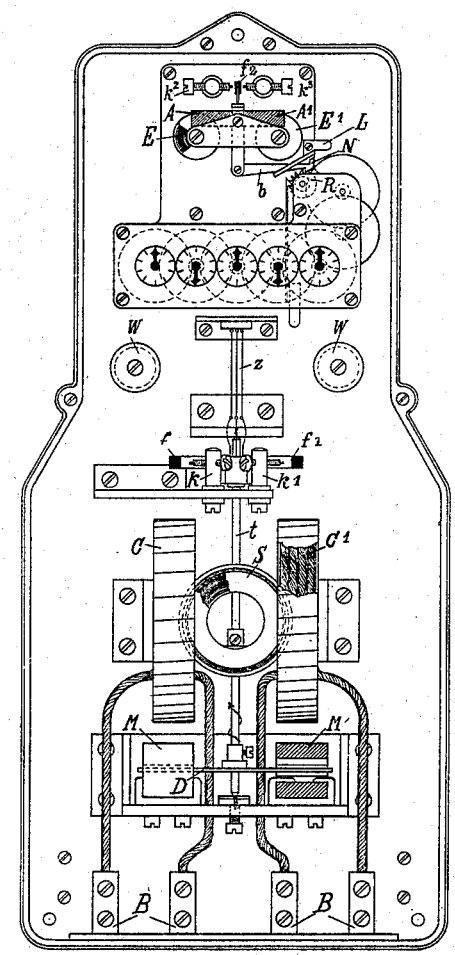

No. 638,055. Patented Nov. 28, 1899.
A. LOTZ.
OSCILLATING METER.
(Application filed Dec. 29, 1897.)
(No Model.) 3 Sheets—Sheet 1.
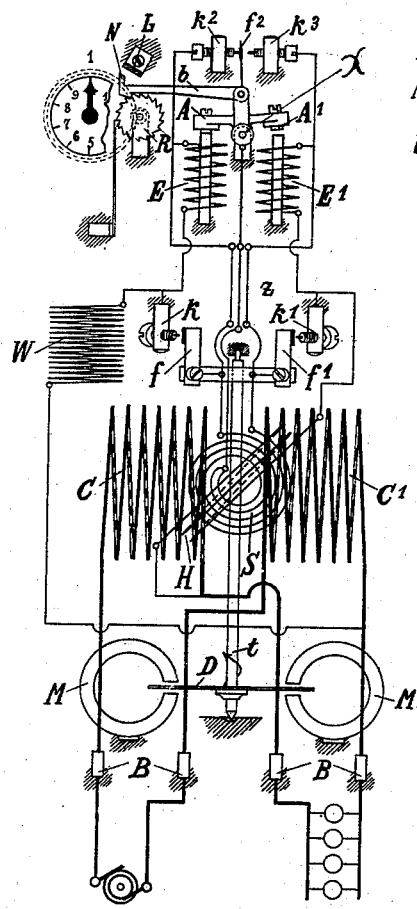
FIG. 1.
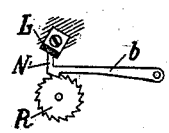
FIG. 2.
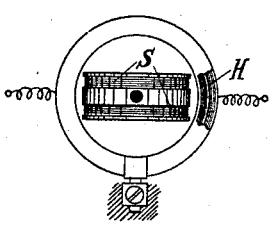
FIG. 3.
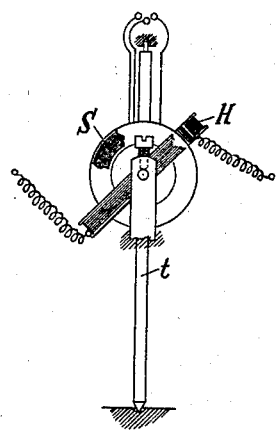
FIG. 4.
FIG. 5.
FIG. 6.
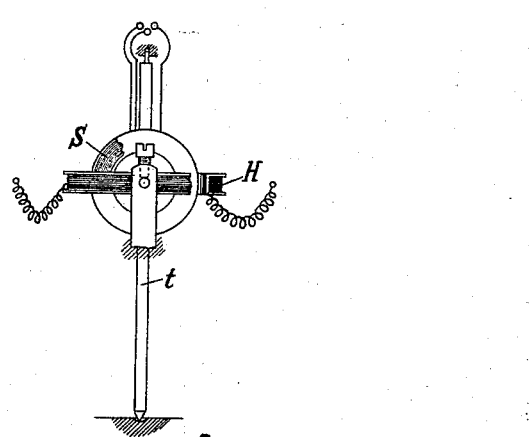

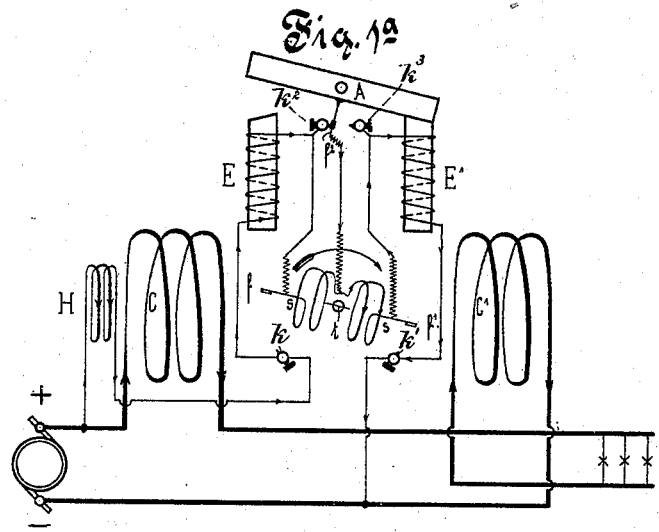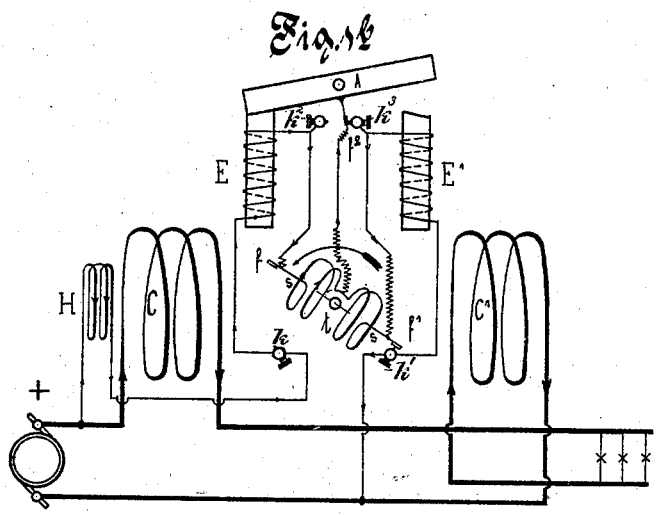

No. 638,055. Patented Nov. 28, 1899.
A. LOTZ.
OSCILLATING METER.
(Application filed Dec. 29, 1897.)
(No Model.) 3 Sheets—Sheet 3.

Witnesses
Inventor
Albert Lotz
By Briesen & _____
his Attorneys

UNITED STATES PATENT OFFICE.

ALBERT LOTZ, OF BERLIN, GERMANY.

OSCILLATING METER.

SPECIFICATION forming part of Letters Patent No. 638,055, dated November 28, 1899.

Application filed December 29, 1897. Serial No. 664,373. (No model.)

*To all whom it may concern:*

Be it known that I, ALBERT LOTZ, residing at Berlin, Germany, have invented certain new and useful Improvements in Oscillating Meters, (for which I have obtained Letters Patent in England, No. 13,080, filed June 13, 1896, accepted June 12, 1897; in Switzerland, No. 12,753, filed July 2, 1896, dated February 28, 1897, and applied for in Germany under date of June 1, 1896,) of which the following is a full, clear, and exact description.

My invention relates to oscillating meters for measuring direct and alternating currents in which an oscillating coil (a shunt-coil is shown) is caused to operate registering apparatus to register the consumption of the current, preferably by means of a moving armature receiving its motion from a magnet or magnets whose circuits are manipulated by the oscillating motor-coil, which armature also preferably operates a switch.

My invention has for its further object to devise a structure wherein the periodic reversals of the current and the oscillations are rendered more certain.

The structure illustrated in the drawings forming part hereof constitutes one embodiment of my invention, the essential features constituting my invention or improvement being set forth in the claims.

Broadly stated, the principles and construction upon which my invention is based are as follows: A suitably-supported swinging coil is connected to the winding of a relay effecting the operation of the registering mechanism and of a current changing or reversing mechanism, which relay is so connected in circuit with the coil through which the main current flows that the oscillations of the relay-armature are effected by the movement of the coil. The swinging coil sets in action certain contacts for governing the flow of current to itself and to the relay. The oscillations of the coil are limited by limiting stops or contacts which are connected in a suitable manner with the winding of the relay, so as to short-circuit or otherwise deaden the relay to effect an oscillation of the armature of the said relay and to reverse the direction of oscillation of the swinging coil of the meter by reversing its magnetization. This reversal of the magnetization, which is effected without interrupting the auxiliary circuit, causes the oscillating motion of the swinging coil and a movement of the registering apparatus corresponding to the periodicity of the oscillations of the swinging coil. This periodicity, according to electrodynamic laws, is when the meter is properly arranged proportional to the product of the current strength consumed and the tension existing between the main conductors, so that the meter is an accurately-operating wattmeter. It may, however, be modified to measure other functions of the current in the circuit.

My invention will be understood by referring to the accompanying drawings, in which—

Figure 8:
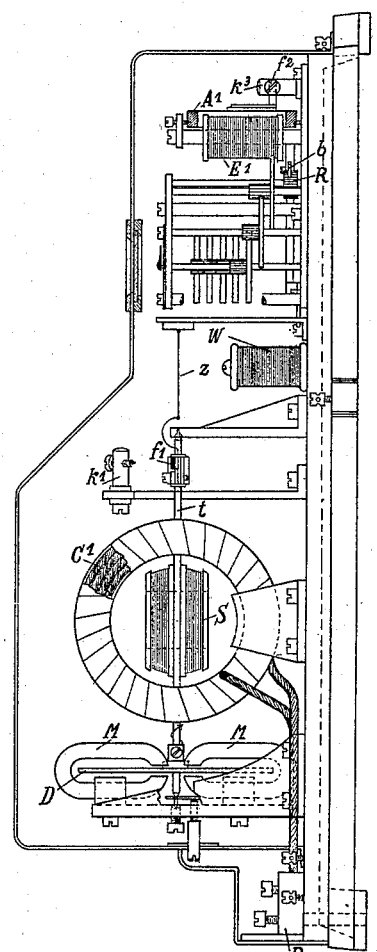
Figure 10:
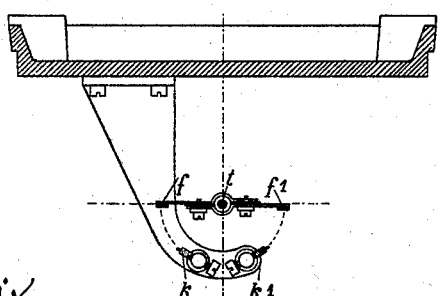
Figure 9:
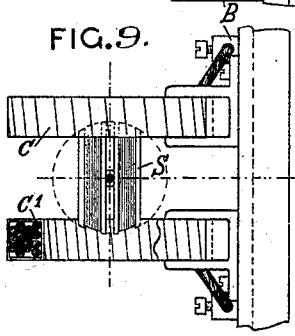

Figure 1 is a diagrammatic view of the meter elements and circuits. Figs. 1$^a$ and 1$^b$ are diagrams of the circuits of the swinging shunt-coil, showing the armature in two positions. Fig. 2 shows in diagram the circuit details of the current-reversing apparatuses for the mechanism just mentioned. Fig. 3 shows a step-by-step ratchet device attached to the relay to operate the current counter or register. Figs. 4, 5, and 6 are detail views of a form of swinging meter-coil and compensating-coil. Fig. 7 is a front view of the meter set up for use. Fig. 8 is a side view thereof. Fig. 9 is a plan view of the lower part of the meter shown in Figs. 7 and 8, and Fig. 10 is a detail of the contact-arms.

In the apparatus shown in the drawings the swinging meter-coil S consists of two windings which are alternately electrically connected with and disconnected from the electromagnets E E' of the relay, which, being alternately short-circuited, produce a rocking movement of the armature A A', which is carried on a rock-shaft X and is provided with a pivoted pawl $b$, actuating the wheel R of the counter or register. The rocking arm is provided with a contact-spring $f^2$, which comes into contact alternately with the contacts $k^2$ or $k^3$, according to the position of the armature, under the influence of the relay-magnets. The contact $f^2$ is electrically connected to the point of junction of the two coils of the swinging coil S. The contacts $k^2\ k^3$ are electrically connected to the ends of the coils of the swinging coil S and to the electromagnets E E', as shown. The contacts or contact-arms $ff'$, which are connected to the ends of the members or coils of the swinging coil S and also to the contacts $k^2$ $k^3$, turn at the same time as the coil S, being mounted on the shaft $t$ thereof, and strike against the contacts $k$ or $k'$, as the case may be. The contacts $k$ $k'$ are electrically connected to the electromagnets E E', which are connected to the main circuit through resistance W on one side and coil H on the other. The shaft $t$ may bear the damping-disk D, turning between the magnets M M, or other suitable braking or damping apparatus may be used, if desired. The coils C C', acting upon the swinging coil S, are fixed and receive current from the mains B B, being herein shown as connected in series with the said mains.

In order to describe the operation of the meter shown in the drawings, I will refer for the present to Figs. 1$^a$ and 1$^b$, in which are exhibited a diagram of the circuits with the parts in different positions, the course of the currents being indicated by arrows on the mains. The series current passes through the series or current coils C C', the coil C being in the positive main and the coil C' in the negative main. The shunt-current when the parts are in the position shown in Fig. 1$^a$ is as follows: The current passes from the positive main through the coil H, thence passes to the contact $k$, thence around the left half of coil E of the relay, and thence to contact $k^2$. As the contact $f^2$ at this instant coöperates with $k^2$ the left half of the coil S is short-circuited through the wire connecting the contact $f^2$ with the coil S, through which wire the current flows to the coil S, thence through the right-hand half thereof, and thence passes by the member E' of the relay to the contact $k'$, and thence to the negative main. At this instant the shunt-coil S is swinging, and the armature A will be held against E' by reason of the fact that it is in contact therewith. As the coil S continues its swing the contact $f'$ will be brought against the contact $k'$, whereupon the current which formerly passed from the coil S to the contact $k^3$ will pass directly by the contact $f'$ to the contact $k'$, and the magnet E' of the relay will be short-circuited. As this takes place the magnet E will attract the armature A and swing it on its pivot until the contact $f^2$ strikes the contact $k^3$. At this instant the parts are in the position shown in Fig. 1$^b$. The short circuit of the left-hand side of the shunt-coil being thus opened, the shunt-coil has a turning moment in the direction of the arrow shown in Fig. 1$^b$ and the contact $f$ will swing away from the contact $k'$, thereby opening the short circuit around the magnet E', and as the shunt-coil continues to swing the contact $f$ will strike against the contact $k$, thereby short-circuiting the magnet E and swinging the armature A back to the position shown in Fig. 1$^a$ by reason of the attraction of the magnet E', which receives current by reason of the fact that the short circuit around it was broken by the swing of the shunt-coil. As soon as the relay has been reversed by contact with one of the two contact-arms a repeated contact has no further effect upon the action of the relay, because the winding affected again becomes inactive and the relay-armature A A' is already in the opposite position. The relay can consequently only cut in or out once during each swing of the coil S, and at the same time the counting or registering apparatus is actuated by aid of the pawl $b$ and the ratchet-wheel R.

In the form of meter above described the relays may be separated from the motors and only connected to the latter by means of conductors, and additional counting apparatus set at suitable points can be operated by the relay-contacts. In order in all cases to obtain a motion of the wheel R by means of the pawl $b$, and consequently a regular operation of the registering mechanism, a projection L, serving as check for the said pawl $b$, or other equivalent device may be provided. In order to compensate exactly for the friction occurring during the oscillation of the motors—namely, that in the bearing of the revolving axle—and to thereby make the meter operative even with the smallest current, there is arranged revolubly around the motor-armature S an auxiliary coil H, consisting of several windings and inserted in the same branch current. (See Figs. 1, 4, 5, and 6.) Through proper adjustment of the inclination-angle between the two planes of the winding the effective electrodynamic force between the two coils can be regulated exactly to correspond with the amount of the bearing-friction of the motor, whereby the same is compensated in the simplest manner.

What I claim, and desire to secure by Letters Patent, is—

1. In an oscillating wattmeter, the combination of a movable contact device moving with the movable shunt-coil of the well-known type of wattmeters, stop-contacts coöperating with the said contact device and limiting the swinging of the shunt-coil, an electromagnetic device in electrical connection with the movable shunt-coil of the wattmeter but having its parts mechanically disconnected therefrom and in electrical connection with the stop-contacts so as to have its electrical condition changed by the said stop-contacts coöperating with the contact device upon the swinging of the shunt-coil, the said electromagnetic device being actuated in consequence thereof moving by mechanical connections, a register and a circuit-changing mechanism, the changing of the electrical condition of the electromagnetic device and the motion of the movable shunt-coil operated by the said circuit-changing mechanism being effected by suitable circuit connections in consecutive alternation without necessitating the opening or closing of the shunt-circuit.

2. In an electric meter, the combination of the following instrumentalities in operative relation, to wit: an oscillating motor-coil consisting of a double winding and provided with contacts, a relay for changing the course of the current in the oscillating motor-coil and provided with contacts coöperating with the contacts of the motor-coil and with a movable armature, a register operated from the armature and circuit connections between the oscillating coil and the relay, whereby upon oscillation of the coil a contact of the coil and of the relay will be in electrical connection with each other and the relay will be thereby actuated to actuate the register and to change the course of the current in the oscillating motor-coil, thereby reversing the movement of the said oscillating motor-coil without necessitating the opening or closing of the circuit of the motor-coil.

3. In an electric meter, the combination of the following instrumentalities in operative relation, to wit: an oscillating motor-coil provided with contacts, a relay consisting of a pair of magnetically-separate electromagnets and a T-shaped armature arranged to be operated to change the course of the current in the oscillating motor-coil and provided with contacts coöperating with the contacts of the motor-coil, a register operated from the armature and circuit connections between the oscillating coil and the relay, whereby upon oscillation of the coil a contact of the coil and of the relay will be in electrical connection with each other and the relay will be thereby actuated to actuate the register and to change the course of the current in the oscillating motor-coil, thereby reversing the movement of the said oscillating motor-coil without necessitating the opening or closing of the circuit of the motor-coil.

4. In an electric meter, the combination of the following instrumentalities in operative relation, to wit: an oscillating motor-coil provided with contacts, a relay consisting of a plurality of coils connected in circuit so as to be operated as two electrically-separate coils with an armature for changing the course of the current in the oscillating motor-coil and provided with contacts coöperating with the contacts of the motor-coil, a register operated from the armature and circuit connections between the oscillating coil and the relay, whereby upon oscillation of the coil a contact of the coil and of the relay will be in electrical connection with each other and the relay will be thereby actuated to actuate the register and to change the course of the current in the oscillating motor-coil, thereby reversing the movement of the said oscillating motor-coil without necessitating the opening or closing of the circuit of the motor-coil.

5. In an oscillating wattmeter, the combination of a contact arm or arms combined with a movable shunt of the well-known type of wattmeters, stationary stops connected to a relay having its winding arranged so as to be magnetized in consecutive alternation in harmony with the movable shunt, a register operated by the said relay and circuit connections whereby the relay-coils are individually alternately short-circuited and the magnetization of the shunt reversed, comprised in part by reversing mechanism consisting of contacts constituting terminals of the relay-coils, which terminals are connected to the shunt-coils and adapted to be operated upon by a contact device also connected to the shunt-coils so that an accidental repeated closure of the circuit effected by the swing of the shunt will be ineffective to operate the relay.

6. In an oscillating wattmeter, the combination of a movable shunt consisting of a double-wound coil having its windings connected together and a relay provided with two coils, stationary contacts $k\ k'$, stationary contacts $k^2\ k^3$ a contact-arm $f^2$ coöperating with the contacts $k^2\ k^3$ the said contact-arm $f^2$ being carried upon a swinging part and circuit connections comprised in part by a circuit connection leading from the swinging part carrying the arm $f^2$ and connected to the middle of the shunt-coil the ends of the said shunt-coil being connected with the contacts $k^2\ k^3$ and with one end of the two relay-coils, the other ends of the relay-coils being connected to the stationary contacts $k\ k'$ of the wattmeter, each of which contacts is connected to the main circuit.

7. In a wattmeter, the combination with current-coils, of an oscillating shunt-coil, contacts coöperating therewith to change the course of current therein, an electromechanical register and circuit connections between the oscillating shunt and the electromechanical register-actuating apparatus, whereby the register will be operated by the oscillations of the shunt-coil.

8. In a wattmeter, the combination with current and a swinging shunt-coil with relay mechanism in electrical connection with the moving parts of the meter, a register operated from the relay mechanism, whereby the disturbing frictional resistance to the motion of the oscillating parts is avoided, and contacts coöperating with the swinging shunt-coil for changing the course of current in the swinging shunt.

9. In an oscillating wattmeter, the combination with contacts controlling an electromechanical registering device, of a swinging tension-coil coöperating with the said contacts, and means for changing the course of current in said tension-coil.

10. In an oscillating wattmeter, the combination of an oscillating tension-coil coöperating with contacts for changing the course of current therein and a relay device governing the register and provided with an armature and circuit connections between the various contacts, whereby the relay-armature will be actuated by the oscillations of the oscillating tension-coil and the circuit connections will be changed without interrupting the flow of the current through the tension-coil.

11. In an oscillating wattmeter, the combination of an electromechanical register and an oscillating shunt-coil of the meter, contacts coöperating therewith to change the flow of current in the oscillating coil, and circuit connections, whereby the oscillations of the shunt-coil will govern the motion of the electromechanical register without interrupting the shunt-current.

12. In a wattmeter, the combination of a series and a swinging shunt-coil, with means for periodically changing the course of the current in the swinging shunt-coil, of an electromechanical registering apparatus whose operation is governed by the movement of the shunt-coil.

13. In an electric meter the combination of a swinging coil, means for periodically changing the course of current in the said swinging coil to cause the same to swing, and an electromechanical register, and circuit connections whereby the movement of the swinging coil will cause the electromechanical register to be actuated, substantially as described and for the purposes set forth.

ALBERT LOTZ.

Witnesses:
    CHARLES H. DAY,
    HENRY HASPER.